US 9,976,358 B2

(12) United States Patent
Poyyara (10) Patent No.: US 9,976,358 B2
(45) Date of Patent: May 22, 2018

(54) TORQUE TRANSMISSION JOINT WITH SHAPE-MEMORY ALLOY CLADDING FOR A BOTTOM-HOLE ASSEMBLY (71) Applicant: Halliburton Energy Services, Inc., Houston, TX (US)

(72) Inventor: Ragi Lohidakshan Poyyara, Pune (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 117 days.

(21) Appl. No.: 15/027,123

(22) PCT Filed: Aug. 25, 2015

(86) PCT No.: PCT/US2015/046732
§ 371 (c)(1),
(2) Date: Apr. 4, 2016

(87) PCT Pub. No.: WO2017/034550
PCT Pub. Date: Mar. 2, 2017

(65) Prior Publication Data
US 2017/0261038 A1    Sep. 14, 2017

(51) Int. Cl.
*E21B 17/04* (2006.01)
*F16D 1/08* (2006.01)
*F03G 7/06* (2006.01)

(52) U.S. Cl.
CPC ............ *E21B 17/04* (2013.01); *F16D 1/0805* (2013.01); *F03G 7/065* (2013.01)

(58) Field of Classification Search
CPC .......... E21B 17/02; E21B 17/04; F03G 7/065; F16D 1/0805
See application file for complete search history.

(56) References Cited

U.S. PATENT DOCUMENTS

| 4,232,751 | A | 11/1980 | Trzedak |
| 4,445,580 | A * | 5/1984 | Sahley .................. E21B 10/003 175/404 |
| 6,173,794 | B1 | 1/2001 | Von Gynz-Rekowski et al. |
| 2006/0287116 | A1 | 12/2006 | White |
| 2009/0090556 | A1 | 4/2009 | Chen |
| 2009/0311061 | A1 | 12/2009 | Santamarina et al. |
| 2013/0153208 | A1* | 6/2013 | Bassinger ............... E21B 17/02 166/241.6 |
| 2013/0282342 | A1 | 10/2013 | Bailey et al. |
| 2015/0083281 | A1* | 3/2015 | Lipkin .................... C22C 19/00 148/563 |

FOREIGN PATENT DOCUMENTS

EP    0512638 A1    11/1992

OTHER PUBLICATIONS

International Search Report and Written Opinion issued by the Korean Intellectual Property Office regarding Internaitonal Application No. PCT/US2015/046732, dated Feb. 4, 2016, 10 pages.

* cited by examiner

*Primary Examiner* — Caroline N Butcher
(74) *Attorney, Agent, or Firm* — Haynes and Boone, LLP (57) ABSTRACT A method and apparatus for transmitting torque in a downhole assembly. The apparatus includes a driver sub, a driveshaft extending within the driver sub, a first insert disposed between the driver sub and the driveshaft, and a first shape-memory alloy cladding bonded to the first insert and configured to transmit torque between the first insert and the driveshaft.

19 Claims, 7 Drawing Sheets

TORQUE TRANSMISSION JOINT WITH SHAPE-MEMORY ALLOY CLADDING FOR A BOTTOM-HOLE ASSEMBLY

TECHNICAL FIELD

The present disclosure relates generally to the transmission of torque and/or rotation between separate components of a downhole assembly such as, for example, a drilling tool, and, more specifically, to enhancing the performance of a torque transmission joint by utilizing a shape-memory alloy cladding on various components thereof.

BACKGROUND

In the process of conducting operations such as, for example, drilling operations, within an oil or gas wellbore, one or more torque transmission joints may be utilized to transfer torque and/or rotation between separate components of a downhole assembly. For example, a torque transmission joint may be utilized to transfer torque from a driver sub to a driveshaft of a drilling tool. The driver sub may be coupled to, and rotated by, a drill string. The driveshaft extends within the driver sub and may be coupled to another well tool such as, for example, a rotary drill bit. The torque transmission joint is disposed in an annular space between the driver sub and the driveshaft. Torque and/or rotation may be transmitted from the driver sub to the driveshaft by establishing an interference fit between the torque transmission joint and the driveshaft. Torque and/or rotation are transmitted from the driver sub to the driveshaft via frictional forces at the interference fit. Conventional interference fits include press-fits and shrink-fits. The use of a press-fit in the torque transmission joint permits easy assembly and disassembly. However, when a press-fit is used, the torque transmission joint is subject to significant wear at the interference fit, resulting in a loss of torque transfer, damage to communication equipment disposed within the drilling tool, and eventual failure. The use of a shrink-fit in the torque transmission joint provides increased wear resistance and reliability. However, when a shrink-fit is used, assembly and disassembly of the torque transmission joint is more difficult. Therefore, what is needed is an apparatus and/or method that addressed one or more or the foregoing issues, among others.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Illustrative embodiments and related methods of the present disclosure are described below as they might be employed in a torque transmission joint with shape-memory alloy cladding for a bottom-hole assembly that includes, for example, a drilling tool. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

The following disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as "beneath," "below," lower," "above," "upper," "uphole," "downhole," "upstream," "downstream," and the like, may be used herein for ease of description to describe the relationship of one element or feature to another element(s) or feature(s) as illustrated in the Figures. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Figure 1:
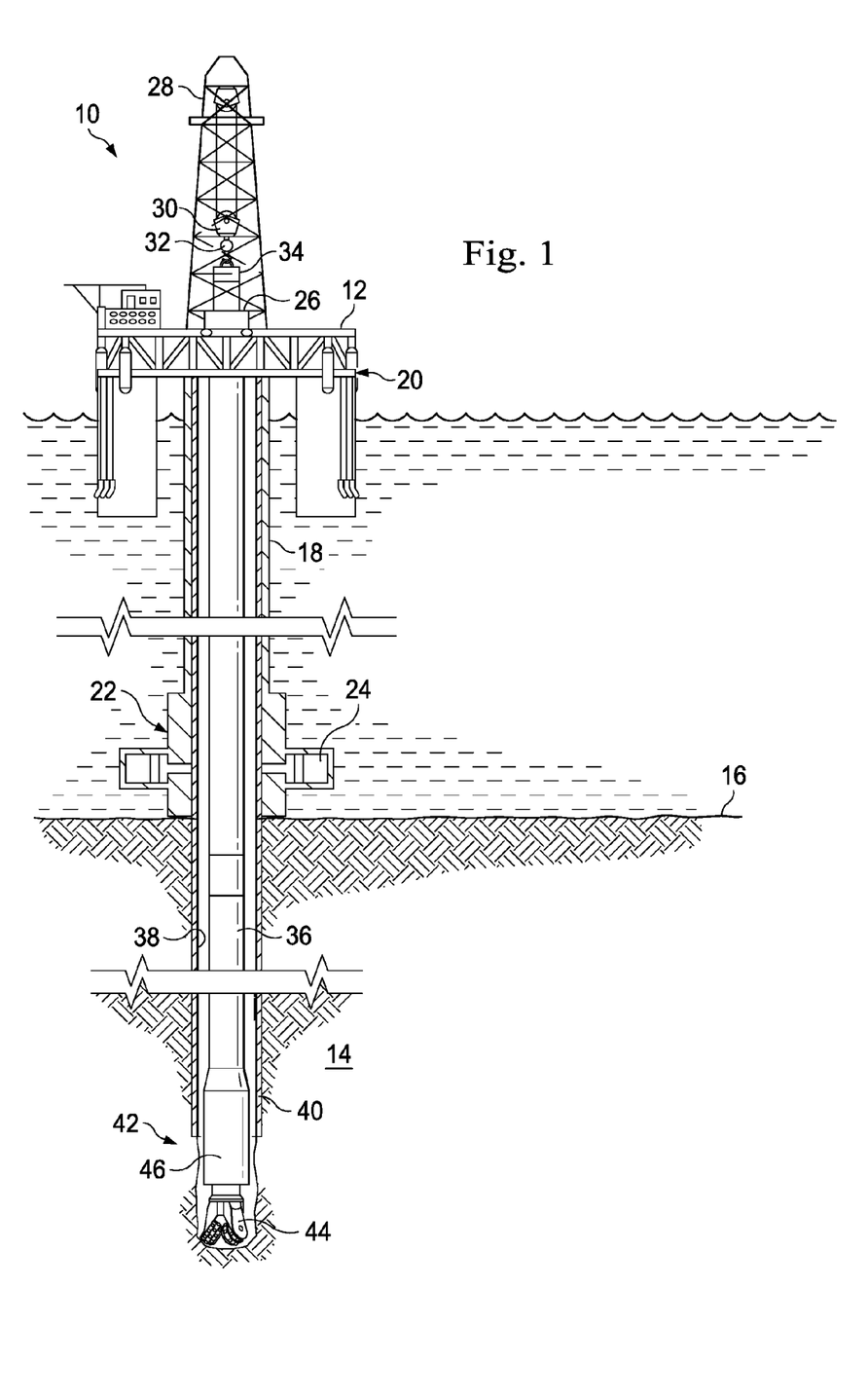
FIG. 1 is a schematic illustration of an offshore oil and gas platform operably coupled to a bottom-hole assembly including a torque transmission joint, according to an exemplary embodiment.

FIG. 1 is a schematic illustration of an offshore oil and gas platform generally designated by the reference numeral 10, operably coupled to a bottom-hole assembly that includes, for example, a drilling tool having a torque transmission joint with shape-memory alloy cladding, according to the present disclosure. The apparatus of the present disclosure is adapted to be coupled to a semi-submersible platform, a drilling ship, or another offshore drilling platform. However, although FIG. 1 depicts an offshore operation, it should be understood that the apparatus according to the present disclosure is equally well suited for use in onshore operations. Further, although FIG. 1 depicts a vertical wellbore, it should be understood that the apparatus according to the present disclosure is equally well suited for use in wellbores having other orientations, including horizontal wellbores, slanted wellbores, multilateral wellbores, or the like. Accordingly, it should be understood that the use of directional terms such as "above," "below," "upper," "lower," "upward," "downward," "uphole," "downhole" and the like are used in relation to the illustrative embodiments as they are depicted in the Figures, the upward and downward directions being toward the top and bottom of the corresponding Figure, respectively, and the uphole and downhole directions being toward the surface and toe of the well, respectively.

In general, the torque transmission joint with shape-memory alloy cladding of the present disclosure is composed of one or more members utilized to transfer torque between separate components of a downhole assembly. The one or more members include contact surfaces having cladding covering at least respective portions thereof. The cladding is comprised of a shape-memory alloy joined to the contact surface(s) via adhesion, which may be achieved, for example, through coating and annealing processes. Shape-memory alloys exhibit characteristics of superelasticity and shape memory. A variety of alloys exhibit superelasticity and shape-memory effects, with the constituent elements of such alloys being formulated to control the properties thereof. The two types of shape-memory alloys most often used for engineering materials are copper-aluminum-nickel, and nickel-titanium (NiTi) alloys. However, shape-memory alloys can also be created by alloying zinc, copper, gold and iron. NiTi based shape-memory alloys are often preferred due to their stability, superior thermo-mechanical performance, high strength, high electrical resistivity, easy workability, and excellent corrosion resistance.

Shape-memory alloys that exhibit the shape-memory effect undergo a solid phase transformation when the material is altered between a lower temperature martensite phase and a higher temperature austenite phase. The temperature at which this phase transformation occurs is called the transformation temperature. The lower temperature martensite exists in two separate forms: twinned-martensite and de-twinned-martensite. Each phase (i.e., twinned-martensite, de-twinned-martensite, and austenite) has its own distinctive properties. De-twinned-martensite is produced by applying stress to deform twinned-martensite, forcing a shift within the shape-memory alloy's microstructure. Subsequent heating of the de-twinned-martensite induces a phase transition from de-twinned-martensite to austenite, thereby causing a strain, or shape recovery, of the shape-memory alloy. During the phase transformation from de-twinned-martensite to austenite, some shape-memory alloys are capable of recovering an induced strain of up to 8%. By way of comparison, the maximum recoverable strain for conventional steels is approximately 0.5%. A similar strain, albeit smaller in degree, can be recovered by heating a shape-memory alloy to induce a phase transformation from twinned-martensite to austenite. The torque transmission joint with shape-memory alloy cladding of the present disclosure utilizes the solid phase transformation from twinned-martensite to austenite.

The solid phase transformation of a shape-memory alloy from twinned-martensite to austenite occurs at a first transformation temperature. However, the solid phase transformation from austenite back to twinned-martensite occurs at a second transformation temperature, which is typically lower than the first transformation temperature. The values of the first and second transformation temperatures depend upon the particular composition of the shape-memory alloy. For example, by adjusting the nickel content of an NiTi based shape-memory alloy between approximately 49% and approximately 51%, the first and second transformation temperatures may be adjusted between approximately negative 100 degrees Celsius and positive 100 degrees Celsius. Further, the transformation temperatures of ternary compositions (in which a small amount of a third element is added to NiTi) may be similarly adjusted. The general properties of shape-memory alloys are well understood, and therefore will not be described in further detail.

In an exemplary embodiment, as illustrated in FIG. 1, the offshore oil and gas platform 10 includes a semi-submersible platform 12 that is positioned over a submerged oil and gas formation 14 located below a sea floor 16. A subsea conduit 18 extends from a deck 20 of the platform 12 to a subsea wellhead installation 22, including blowout preventers 24. The platform 12 may include a hoisting apparatus 26, a derrick 28, a travel block 30, a hook 32, and a swivel 34 for raising and lowering pipe strings such as, for example, a substantially tubular, axially extending drill string 36. Further, the platform may include a rotary table or top drive (not shown) adapted to rotate the drill string 36. A wellbore 38 extends through the various earth strata including the formation 14, with a portion of the wellbore 38 having a casing string 40 cemented therein. A bottom-hole assembly 42 is connected at the lower end portion of the drill string 36 and extends within the wellbore 38. The bottom-hole assembly 42 includes a rotary drill bit 44 adapted to drill through the various earth strata, including the formation 14. Additionally, the bottom-hole assembly 42 includes a torque transmission joint 46 adapted to transfer torque and/or rotation from the drill string 36 to the rotary drill bit 44.

The bottom-hole assembly 42 may also include other components such as, for example, a mud motor, a telemetry system, a power generation system, logging-while-drilling tools, measurement-while-drilling tools, drill collars, heavy-weight drill pipe, stabilizers, reamers, jarring devices, hole-openers, crossovers for various threadforms, other downhole components, or any combination thereof. In several exemplary embodiments, the torque transmission joint 46 is incorporated into a directional drilling tool. In several exemplary embodiments, in addition to, or instead of, transferring torque and/or rotation from the drill string 36 to the rotary drill bit 44, the torque transmission joint 46 is adapted to transfer torque and/or rotation between various other components of the bottom-hole assembly 42. Furthermore, although the torque transmission joint 46 has been described as part of the bottom-hole assembly 42, any one of a number of downhole well tools may incorporate the torque transmission joint 46, or another torque transmission joint, to transfer torque and/or rotation between the components thereof.

Figure 2:
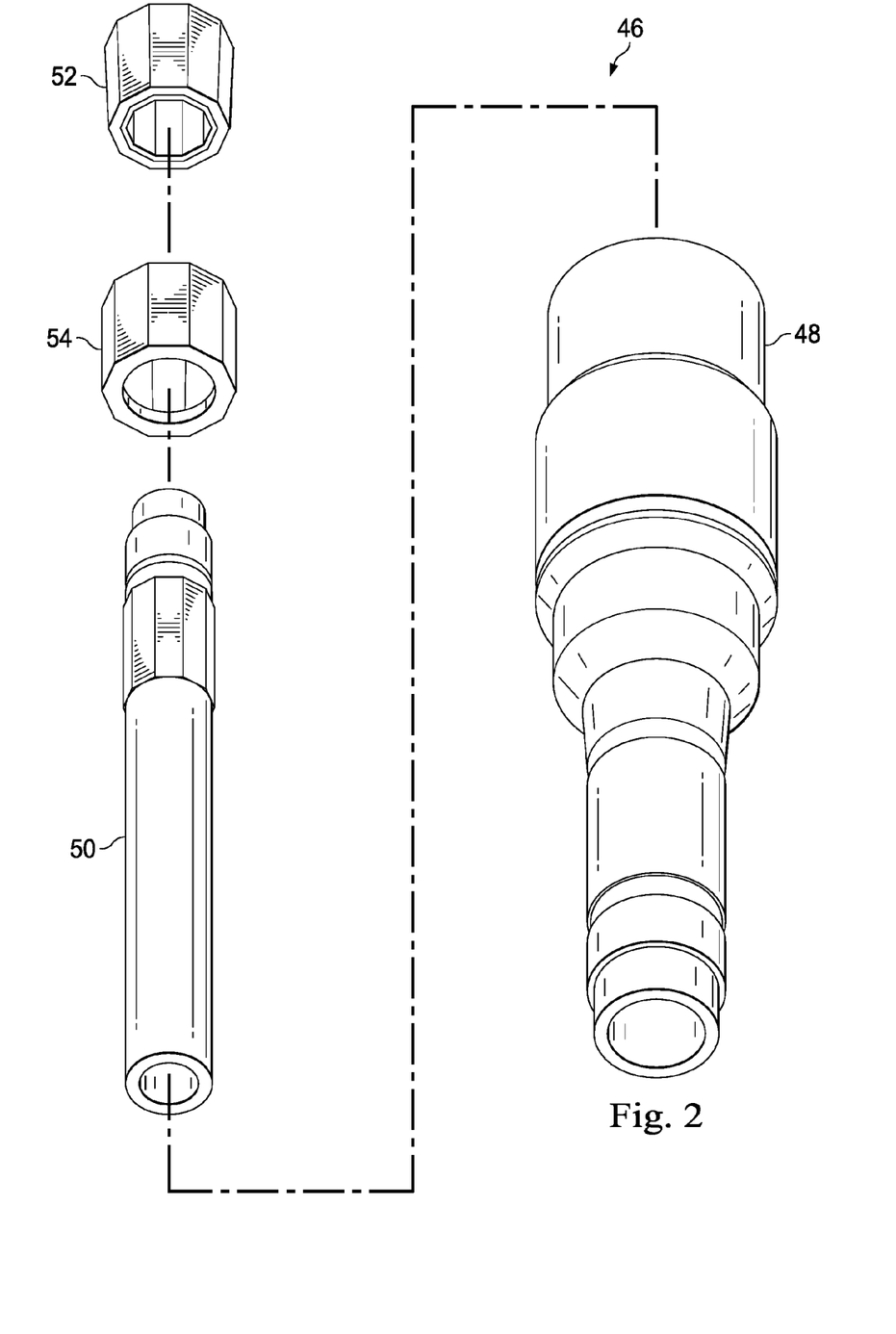
FIG. 2 is an exploded view of the torque transmission joint of FIG. 1, the torque transmission joint including a driver sub, a driveshaft, an inner insert, and an outer insert, according to an exemplary embodiment.

In an exemplary embodiment, as illustrated in FIG. 2 with continuing reference to FIG. 1, the torque transmission joint 46 includes a driver sub 48, a driveshaft 50, an inner insert 52, and an outer insert 54. The driver sub 48 is generally tubular in shape and is adapted to be coupled to the drill string 36. The driveshaft 50 is adapted to extend within the driver sub 48 and is to be coupled to the rotary drill bit 44. The inner and outer inserts 52 and 54, respectively, are adapted to be disposed within an annular space defined between the driver sub 48 and the driveshaft 50. When the inner and outer inserts 52 and 54, respectively, are so disposed, the outer insert 54 circumscribes at least a portion of the inner insert 52 and mates with both the inner insert 52 and the driver sub 48. Further, the inner insert 52 extends at least partially within the outer insert 54 and mates with both the outer insert 54 and the driveshaft 50. As a result, the inner and outer inserts 52 and 54, respectively, are adapted to transfer torque and/or rotation from the driver sub 48 to the driveshaft 50. The structure and operation of the torque transmission joint 46, including the driver sub 48, the driveshaft 50, the inner insert 52, and the outer insert 54 will be discussed in further detail below.

Figure 3:
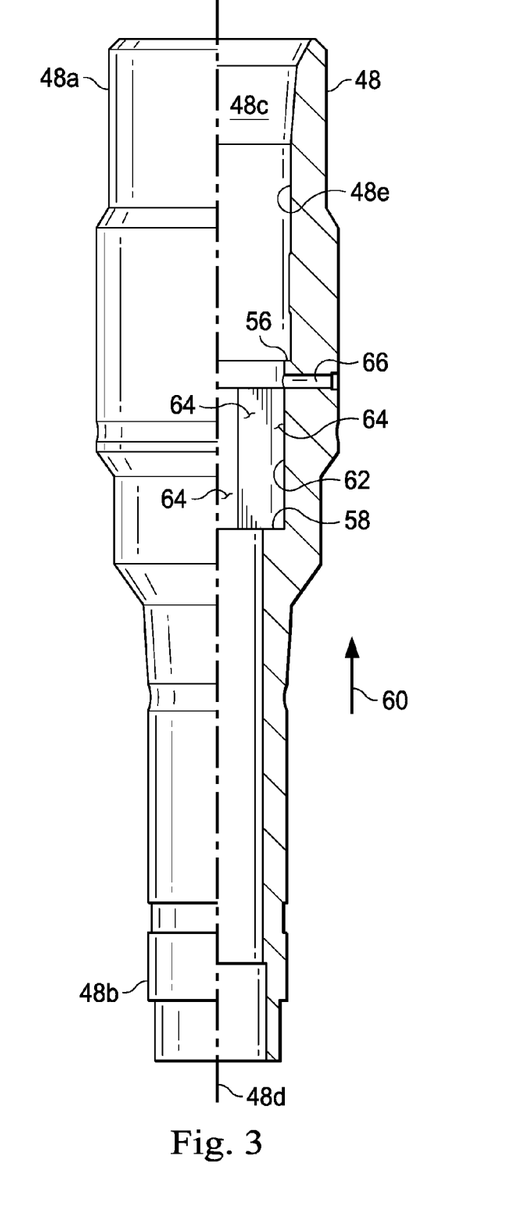
FIG. 3 is a partial-sectional view of the driver sub of FIG. 2, according to an exemplary embodiment.

In an exemplary embodiment, as illustrated in FIG. 3 with continuing reference to FIGS. 1 and 2, the driver sub 48 defines opposing end portions 48a and 48b. The end portion 48a of the driver sub 48 is adapted to be coupled to the drill string 36. Further, an internal passage 48c extends through the driver sub 48 along a longitudinal axis 48d, from the end portion 48a to the end portion 48b thereof. The driver sub 48 also includes an internal surface 48e defined by the internal passage 48c and extending about the longitudinal axis 48d. The internal surface 48e of the driver sub 48 includes a pair of internal annular shoulders 56 and 58, each facing in an axial direction 60. The annular shoulder 56 defines an inside diameter and an outside diameter, and, as compared to the annular shoulder 58, is located relatively nearer to the end portion 48a of the driver sub 48. Similarly, the annular shoulder 58 defines an inside diameter and an outside diameter, and, as compared to the annular shoulder 56, is located relatively farther away from the end portion 48a of the driver sub 48. As a result, the internal surface 48e of the driver sub 48 defines a contact surface 62 extending between the inside diameter of the annular shoulder 56 and the outside diameter of the annular shoulder 58. The contact surface 62 includes a plurality of axially-extending and circumferentially-spaced polygonal flats 64, distributed evenly about the internal passage 48c. In an exemplary embodiment, the contact surface 62 includes ten of the polygonal flats 64. However, the contact surface 62 may include any suitable number of the polygonal flats 64 such as, for example, two flats, three flats, four flats, five flats, six flats, seven flats, eight flats, nine flats, eleven flats, twelve flats, or more. In an exemplary embodiment, the inside diameter of the annular shoulder 56 is substantially equal to the outside diameter of the annular shoulder 58, such that the contact surface 62 and the polygonal flats 64 are spaced in a parallel relation with the longitudinal axis 48d of the driver sub 48. In several exemplary embodiments, the inside diameter of the annular shoulder 56 is greater than the outside diameter of the annular shoulder 58, such that the contact surface 62 and the polygonal flats 64 are tapered inwardly towards the longitudinal axis 48d of the driver sub 48, from the annular shoulder 56 to the annular shoulder 58. A radially extending port 66 is formed through the driver sub 48 at the contact surface 62.

Figure 4:
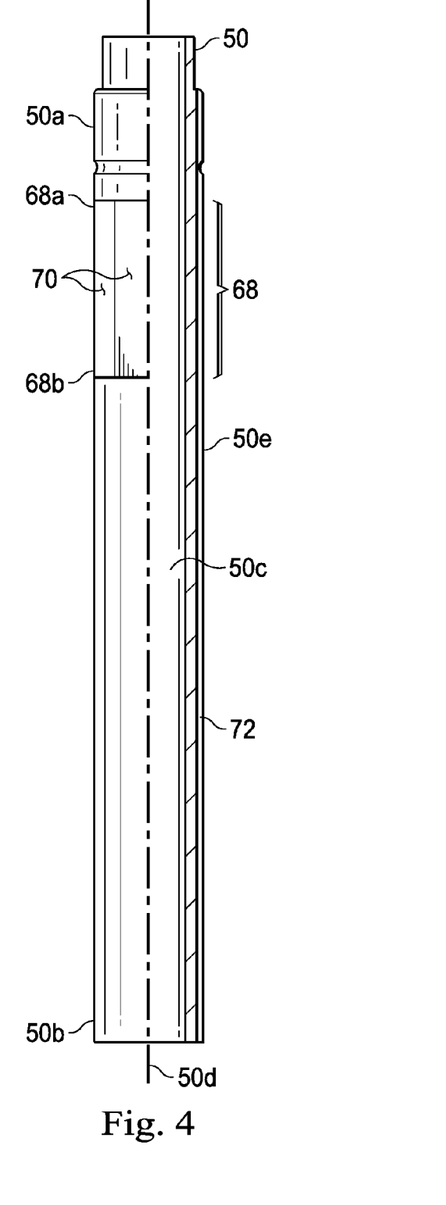
FIG. 4 is a partial-sectional view of the driveshaft of FIG. 2, according to an exemplary embodiment.

In an exemplary embodiment, as illustrated in FIG. 4 with continuing reference to FIGS. 1-3, the driveshaft 50 defines opposing end portions 50a and 50b. The end portion 50b of the driveshaft 50 is adapted to be coupled to the rotary drill bit 44 (shown in FIG. 1). Further, an internal passage 50c extends through the driveshaft 50 along a longitudinal axis 50d, from the end portion 50a to the end portion 50b thereof. In several exemplary embodiments, the internal passage 50c is adapted to permit the flow of a fluid therethrough such as, for example, a drilling fluid, during operations such as, for example, drilling operations. The driveshaft 50 also includes an external surface 50e extending about the longitudinal axis 50d. The external surface 50e defines a contact surface 68 proximate the end portion 50a thereof. The contact surface 68 defines opposing end portions 68a and 68b. The end portion 68a of the contact surface 68 is adapted to be disposed radially adjacent the internal annular shoulder 56 of the driver sub 48, and, as compared to the end portion 68b, is located relatively nearer to the end portion 50a of the driveshaft 50. Similarly, the end portion 68b of the contact surface 68 is adapted to be disposed radially adjacent the internal annular shoulder 58 of the driver sub 48, and, as compared to the end portion 68a, is located relatively farther away from the end portion 50a of the driveshaft 50. The contact surface 68 of the driveshaft 50 is adapted to be coupled to the contact surface 62 of the driver sub 48, via the inner and outer inserts 52 and 54, respectively, as will be discussed in further detail below. The contact surface 68 of the driveshaft 50 includes a plurality of axially-extending and circumferentially-spaced polygonal flats 70, distributed evenly about the external surface 50e. In an exemplary embodiment, the contact surface 68 includes ten of the polygonal flats 70. However, the contact surface 68 may include any suitable number of the polygonal flats 70 such as, for example, two flats, three flats, four flats, five flats, six flats, seven flats, eight flats, nine flats, eleven flats, twelve flats, or more. In an exemplary embodiment, the contact surface 68 and, consequently, the polygonal flats 70, are spaced in a parallel relation with the longitudinal axis 50d of the driveshaft 50. In another exemplary embodiment, the contact surface 68 and, consequently, the polygonal flats 70 are tapered inwardly towards the longitudinal axis 50d of the driveshaft 50, from the end portion 68a to the end portion 68b of the contact surface 68. In several exemplary embodiments, the driveshaft 50 also includes a groove 72 formed in the external surface 50e and extending axially from the contact surface 68 toward the end portion 50b of the driveshaft 50.

Figure 5:
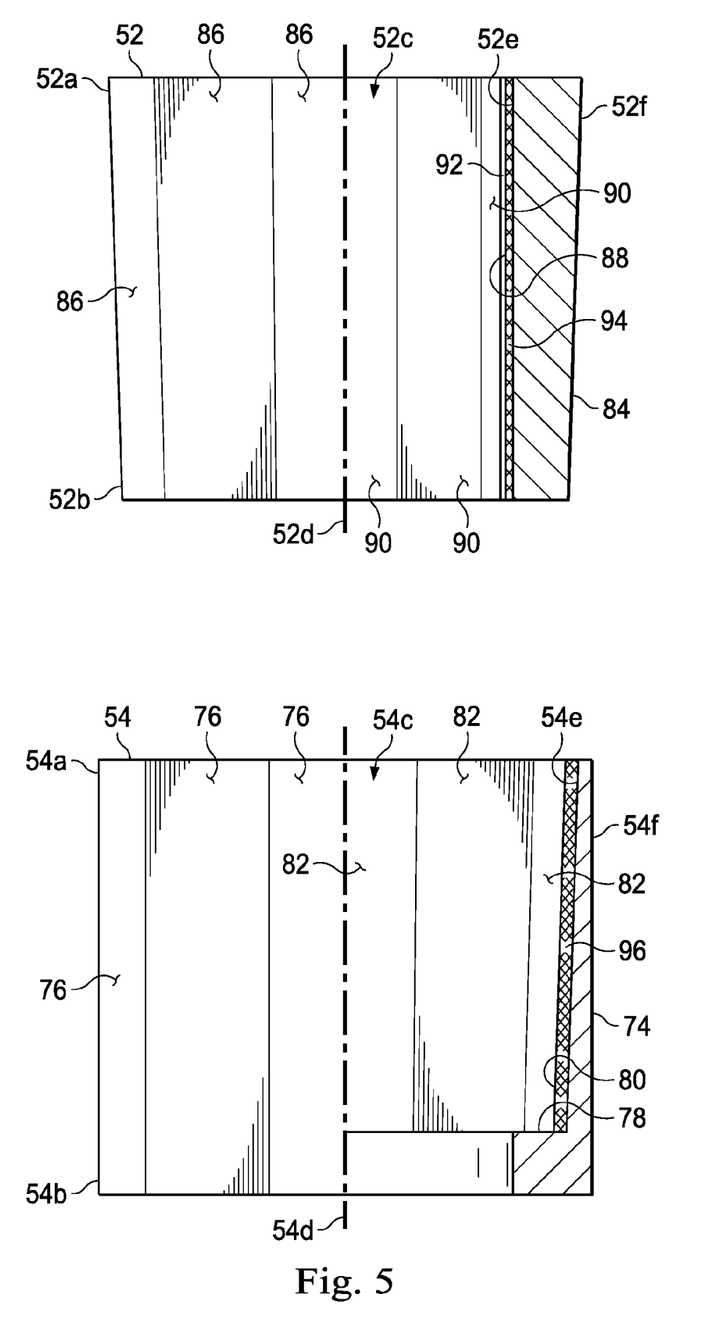
FIG. 5 is a partial-sectional view of the inner and outer inserts of FIG. 2, the inner and outer inserts each including a shape-memory alloy cladding on an internal surface thereof, according to an exemplary embodiment.

In an exemplary embodiment, as illustrated in FIG. 5 with continuing reference to FIGS. 1-4, the inner and outer inserts 52 and 54, respectively, are adapted to mate with one another in order to transfer torque and/or rotation from the driver sub 48 to the driveshaft 50. The outer insert 54 defines opposing end portions 54a and 54b. The end portion 54b is adapted to abut the internal annular shoulder 58 of the driver sub 48. Further, the end portion 54a is adapted to be disposed between the annular shoulder 58 and the radially extending port 66, adjacent the contact surface 62 of the driver sub 48. An internal passage 54c extends through the outer insert 54 and along a longitudinal axis 54d, from the end portion 54a to the end portion 54b thereof. The outer insert 54 also includes internal and external surfaces 54e and 54f, respectively, extending about the longitudinal axis 54d.

The external surface 54f of the outer insert 54 defines an outside contact surface 74. The outside contact surface 74 is adapted to mate with the contact surface 62 of the driver sub 48. Specifically, the outside contact surface 74 of the outer insert 54 includes a plurality of axially-extending and circumferentially-spaced polygonal flats 76, distributed evenly about the external surface 54f thereof. The polygonal flats 76 of the outer insert 54 correspond to, and are adapted to mate with, the polygonal flats 64 of the driver sub 48. Accordingly, the outside contact surface 74 of the outer insert 54 and the contact surface 62 of the driver sub 48 each include an equal number of polygonal flats 64 and 76, respectively. In an exemplary embodiment, the outside contact surface 74 and, consequently, the polygonal flats 76, are spaced in a parallel relation with the longitudinal axis 54d of the outer insert 54. In another exemplary embodiment, the outside contact surface 74 and, consequently, the polygonal flats 76 are tapered inwardly towards the longitudinal axis 54d of the outer insert 54, from the end portion 54a to the end portion 54b thereof. In several exemplary embodiments, the degree to which the outside contact surface 74 of the outer insert 54 is tapered is substantially equal to the degree to which the contact surface 62 of the driver sub 48 is tapered.

The internal surface 54e of the outer insert 54 includes an internal annular shoulder 78 adapted to face in the axial direction 60 (most clearly shown in FIG. 3). The annular shoulder 78 is located proximate the end portion 54b of the outer insert 54, and defines an inside diameter and an outside diameter. Further, the internal surface 54e of the outer insert 54 defines an inside diameter proximate the end portion 54a thereof. As a result, the internal surface 54e of the outer insert 54 defines an inside contact surface 80 extending between the end portion 54a and the annular shoulder 78. The inside contact surface 80 includes a plurality of axially-extending and circumferentially-spaced polygonal flats 82, distributed evenly about the internal passage 54c. In an exemplary embodiment, the inside contact surface 80 includes ten of the polygonal flats 82. However, the inside contact surface 80 may include any suitable number of the polygonal flats 82 such as, for example, two flats, three flats, four flats, five flats, six flats, seven flats, eight flats, nine flats, eleven flats, twelve flats, or more. In an exemplary embodiment, the inside diameter of the internal surface 54e proximate the end portion 54a of the outer insert 54 is substantially equal to the outside diameter of the annular shoulder 78, such that the inside contact surface 80 and the polygonal flats 82 are spaced in a parallel relation with the longitudinal axis 54d of the outer insert 54. In several exemplary embodiments, the inside diameter of the internal surface 54e proximate the end portion 54a is greater than the outside diameter of the annular shoulder 78, such that the inside contact surface 80 and the polygonal flats 82 are tapered inwardly toward the longitudinal axis 54d of the outer insert 54, from the end portion 54a to the annular shoulder 78.

In an exemplary embodiment, with continuing reference to FIG. 5, the inner insert 52 defines opposing end portions 52a, 52b. The end portion 52b is adapted to be disposed adjacent the internal annular shoulder 78 of the outer insert 54. Further, the end portion 52a is adapted to be disposed adjacent the inside contact surface 80 of the outer insert 54 and/or the contact surface 62 of the driver sub 48, between the internal annular shoulder 78 of the outer insert 54 and the radially extending port 66 of the driver sub 48. An internal passage 52c extends through the inner insert 52 along a longitudinal axis 52d, from the end portion 52a to the end portion 52b thereof. The inner insert 52 also includes internal and external surfaces 52e and 52f, respectively, extending about the longitudinal axis 52d.

The external surface 52f of the inner insert 52 defines an outside contact surface 84 adapted to mate with the inside contact surface 80 of the outer insert 54. Specifically, the outside contact surface 84 of the inner insert 52 includes a plurality of axially-extending and circumferentially-spaced polygonal flats 86, distributed evenly about the external surface 52f thereof. The polygonal flats 86 of the inner insert 52 correspond to, and are adapted to mate with, the polygonal flats 82 of the outer insert 54. Accordingly, the outside contact surface 84 of the inner insert 52 and the inside contact surface 80 of the outer insert 54 each include an equal number of polygonal flats 86 and 82, respectively. In an exemplary embodiment, the outside contact surface 84 and, consequently, the polygonal flats 86, are spaced in a parallel relation with the longitudinal axis 52d of the inner insert 52. In another exemplary embodiment, the outside contact surface 84 and, consequently, the polygonal flats 86 are tapered inwardly towards the longitudinal axis 52d of the inner insert 52, from the end portion 52a to the end portion 52b thereof. In several exemplary embodiments, the degree to which the outside contact surface 84 of the inner insert 52 is tapered is substantially equal to the degree to which the inside contact surface 80 of the outer insert 54 is tapered.

The internal surface 52e of the inner insert 52 defines an inside contact surface 88 adapted to mate with the contact surface 68 of the driveshaft 50. Specifically, the inside contact surface 88 of the inner insert 52 includes a plurality of axially-extending and circumferentially-spaced polygonal flats 90, distributed evenly about the internal passage 52c thereof. The polygonal flats 90 of the inner insert 52 correspond to, and are adapted to mate with, the polygonal flats 70 of the driveshaft 50. Accordingly, the inside contact surface 88 of the inner insert 52 and the contact surface 68 of the driveshaft 50 each include an equal number of the polygonal flats 90 and 70, respectively. In an exemplary embodiment, the inside contact surface 88 and, consequently, the polygonal flats 90, are spaced in a parallel relation with the longitudinal axis 52d of the inner insert 52. In another exemplary embodiment, the inside contact surface 88 and, consequently, the polygonal flats 90 are tapered inwardly towards the longitudinal axis 52d of the inner insert 52, from the end portion 52a to the end portion 52b thereof. In yet another exemplary embodiment, the degree to which the inside contact surface 88 of the inner insert 52 is tapered is substantially equal to the degree to which the contact surface 70 of the driveshaft 50 is tapered. In several exemplary embodiments, the inner insert 52 also includes a groove 92 formed in the internal surface 52e and extending axially along the length thereof, between the end portion 52a and the end portion 52b. In those embodiments including both the groove 72 in the driveshaft 50 and the groove 92 in the inner insert 52, the groove 92 is adapted to extend adjacent to, and coincident with, the groove 72.

In an exemplary embodiment, with continuing reference to FIG. 5, the internal surfaces 52e and 54e, respectively, of the inner and outer inserts 52 and 54 are clad with a shape-memory alloy. Specifically, the internal surface 52e of the inner insert 52 includes a shape-memory alloy cladding 94 that covers at least a portion of the inside contact surface 88 and, consequently, the polygonal flats 90. Similarly, the internal surface 54e of the outer insert 54 includes a shape-memory alloy cladding 96 that covers at least a portion of the inside contact surface 80 and, consequently, the polygonal flats 82. Upon application and, optionally, annealing of the shape-memory alloy cladding 94 and 96, adhesion occurs between the contact surfaces 88 and 80, respectively, and the shape-memory alloy cladding 94 and 96. As a result, the shape-memory alloy cladding 94 is permanently bonded to the inner insert 52, and the shape-memory alloy cladding 96 is permanently bonded to the outer insert 54. In an exemplary embodiment, the thickness of the shape-memory alloy cladding 96 of the outer insert 54 is greater than the thickness of the shape-memory alloy cladding 96 of the inner insert 52. In several exemplary embodiments, the inner and outer inserts 52 and 54, respectively, are manufactured from 4145H Modified Alloy Steel, and the shape-memory alloy cladding 94 and 96 are manufactured from NiTi shape-memory alloy. In several exemplary embodiments, in addition to, or instead of, the shape-memory alloy cladding 94 and 96 on the inner and outer inserts 52 and 54, respectively, the contact surface 62 of the driver sub 48 si clad with another shape-memory alloy cladding that is substantially similar to the shape memory alloy cladding 94 and 96.

Figure 6:
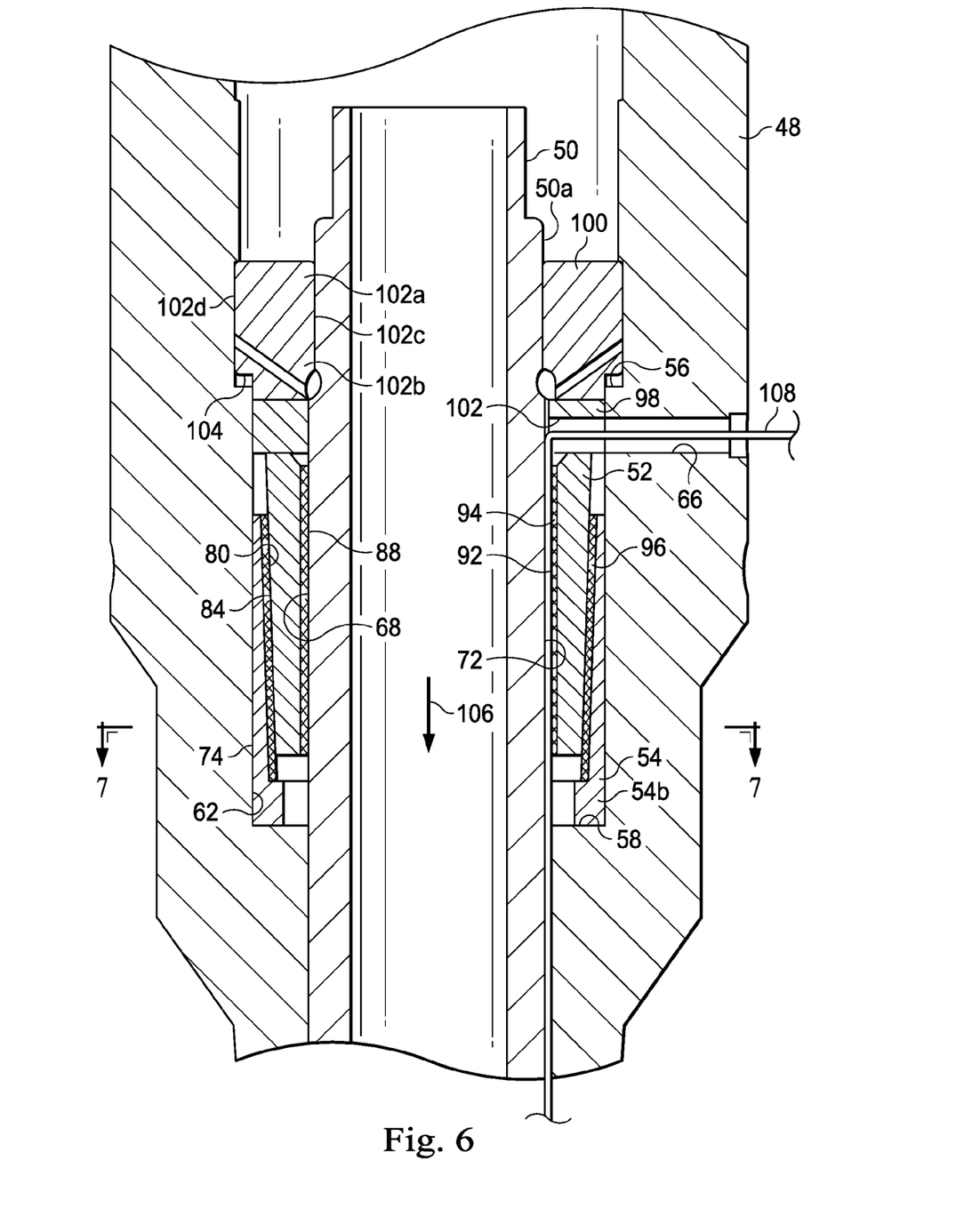
FIG. 6 is an assembled view of a portion of the torque transmission joint of FIG. 2, according to an exemplary embodiment.

In an exemplary embodiment, as illustrated in FIG. 6 with continuing reference to FIGS. 1-5, the inner and outer inserts 52 and 54, respectively, are positioned radially between the driver sub 48 and the driveshaft 50, and axially between the annular shoulders 56 and 58, respectively, of the driver sub 48. The inner and outer inserts 52 and 54, respectively, are held in position by a wire cap 98 and a tension lock-nut 100. In an exemplary embodiment, the wire cap 98 extends circumferentially within the annular space defined between the driveshaft 50 and the driver sub 48. Further, the wire cap 98 is axially disposed between the end portion 52*a* of the inner insert 52 and the annular shoulder 56 of the driver sub 48. A radially-extending port 102 is formed through the wire cap 98. The radially-extending port 102 is substantially aligned with the radially extending port 66 of the driver sub 48.

The tension lock-nut 100 extends circumferentially within the annular space defined between the driveshaft 50 and the driver sub 48. The tension lock-nut 100 defines opposing end portions 102*a*, 102*b*. The end portion 102*b* abuts the wire cap 98. The tension lock-nut 100 also includes internal and external surfaces 102*c* and 102*d*, respectively. An external annular shoulder 104 is formed on the external surface 102*d* of the tension lock-nut 100. The external annular shoulder 104 faces in an axial direction 106, which is opposite the axial direction 60 in which the internal annular shoulder 56 faces. The tension lock-nut 100 is threaded onto the external surface 50*e* of the driveshaft 50. Accordingly, the tension lock-nut 100 is adapted to be threadably advanced along the driveshaft 50 in the axial direction 106, thereby applying an axial load on the wire cap 98, the inner insert 52, the outer insert 54, and, finally, the internal annular shoulder 58 of the driver sub 48. When the tension lock-nut 100 is threadably advanced in this manner, the inside contact surface 88 of the inner insert 52 is urged axially in the axial direction 106 relative to the contact surface 68 of the driveshaft 50. Further, the outside contact surface 84 of the inner insert 52 is urged axially in the axial direction 106 relative to the inside contact surface 80 of the outer insert 54. Further still, the outside contact surface 74 of the outer insert 54 is urged axially in the axial direction 106 relative to the contact surface 62 of the driver sub 48, such that the end portion 54*b* of the outer insert 54 abuts the internal annular shoulder 58 of the driver sub 48. In an exemplary embodiment, the external annular shoulder 104 of the tension lock-nut 100 is adapted to contact the internal annular shoulder 56 of the driver sub 48, thereby limiting the axial advancement of the tension lock-nut 100 in the axial direction 106. The position of the external annular shoulder 104 controls and/or limits the axial load that may be applied by the tension lock-nut 100 on the wire cap 98, the inner insert 52, the outer insert 54, and the internal annular shoulder 58. In several exemplary embodiments, in response to the axial advancement of the tension lock-nut 100 in the axial direction 106, the inner insert 52 is urged radially inward toward the longitudinal axis 52*d* and, consequently, the contact surface 68 of the driveshaft 50. Additionally, in response to the axial advancement of the tension lock-nut 100 in the axial direction 106, the outer insert 54 is urged radially outward from the longitudinal axis 54*d* and, consequently, toward the contact surface 62 of the driver sub 48.

In several exemplary embodiments, with continuing reference to FIG. 6, one or more bus wires 108 extend within the substantially aligned radially extending ports 66 and 102, respectively, of the driver sub 48 and the wire cap 98. The bus wires 108 also extend within the grooves 72 and 92, respectively, of the driveshaft 50 and the inner insert 52. The bus wires 108 may be utilized, for example, to communicate signals from various components of the bottom-hole assembly 42, via the telemetry system, along the drill string 36 and to the surface.

Figure 7A:
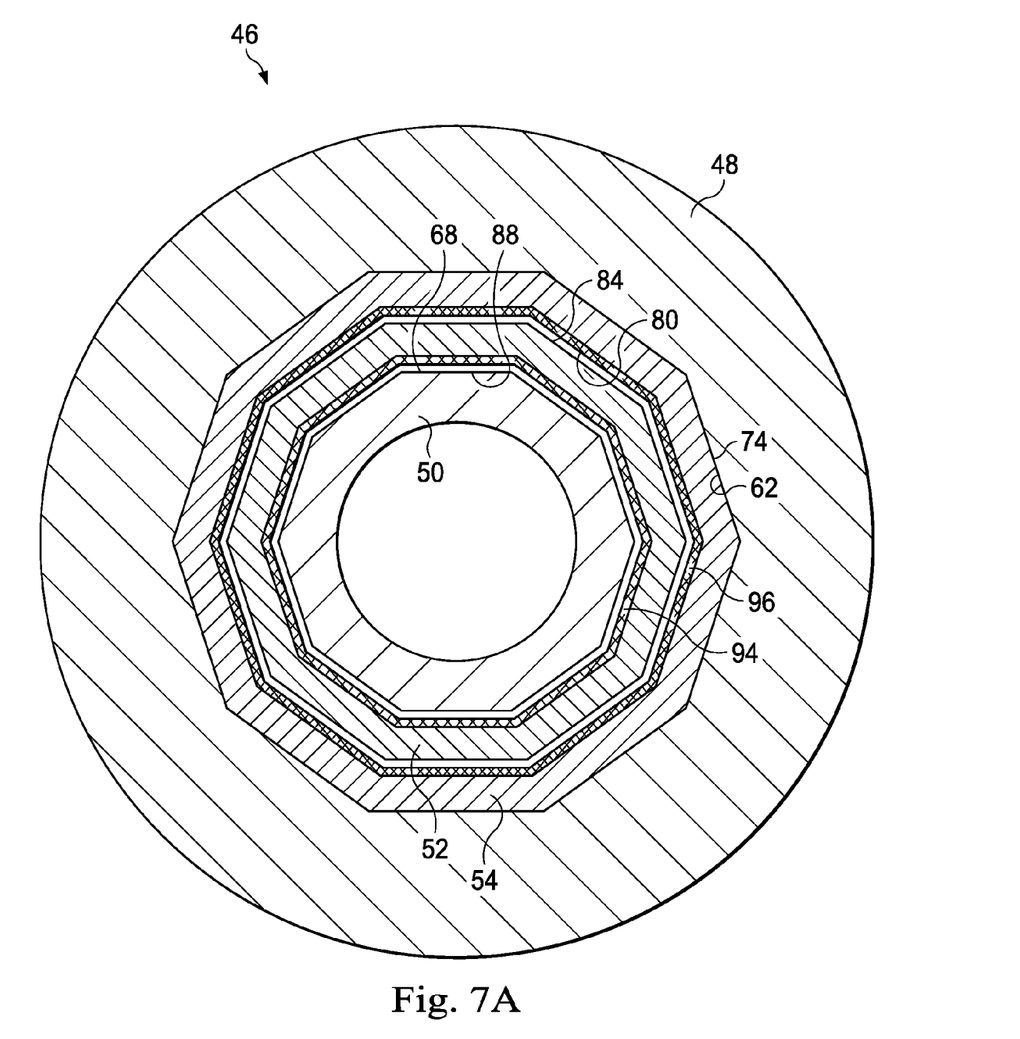
FIG. 7A is a cross-sectional view of the torque transmission joint of FIG. 6, taken along the line 7-7, the shape-memory alloy cladding of the inner and outer inserts in a first solid phase, according to an exemplary embodiment.
Figure 7B:
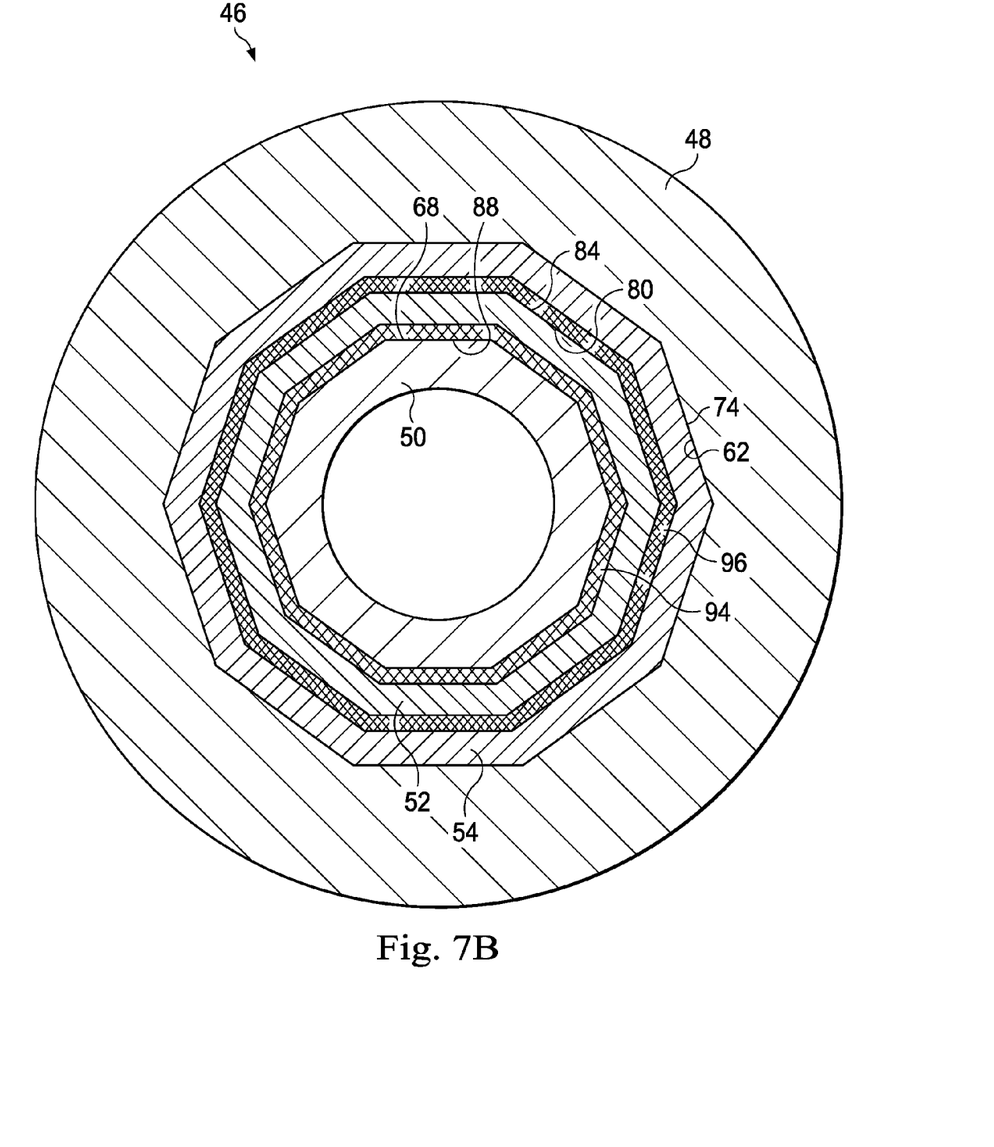
FIG. 7B is a cross-sectional view of the torque transmission joint of FIGS. 6 and 7A, along the line 7-7 of FIG. 6, the shape-memory alloy cladding of the inner and outer inserts in a second solid phase, according to an exemplary embodiment.

In operation, as shown in FIGS. 7A and 7B with continuing reference to FIGS. 1-6, one or more interference fits are established in the torque transmission joint 46 by effecting a solid phase transformation (from twinned-martensite to austenite) of the respective shape-memory alloy cladding 94 and 96 of the inner and outer inserts 52 and 54. Specifically, referring to FIG. 7A, the shape-memory alloy cladding 94 and 96, respectively, are each formulated with a transformation temperature that allows for assembly of the torque transmission joint 46 while the shape-memory alloy cladding 94 and 96 are in the twinned-martensite phase. As a result, the solid phase transformation of the shape-memory alloy cladding 94 and 96, respectively, from twinned-martensite to austenite does not occur until after the torque transmission joint 46 is assembled. In several exemplary embodiments, in order to accomplish this effect, the respective transformation temperatures of the shape-memory alloy cladding 94 and 96 are configured to be slightly above the temperature at which the torque transmission joint 46 is assembled. Thus, the torque transmission joint 46 is assembled at a temperature below the respective transformation temperatures of the shape-memory alloy cladding 94 and 96. The torque transmission joint 46 is assembled by positioning the outer insert 54 such that the outside contact surface 74 thereof mates with the contact surface 62 of the driver sub 48. In several exemplary embodiments, an interference fit is established between the outside contact surface 74 of the outer insert 54 and the contact surface 62 of the driver sub 48 by, for example, press-fitting the outer insert 54 into the driver sub 48. Additionally, the outer insert 54 is positioned such that the inside contact surface 80 thereof, including the shape-memory alloy cladding 96, mates with the outside contact surface 84 of the inner insert 52. In an exemplary embodiment, during assembly, a clearance fit is established between the shape-memory cladding 96 of the outer insert 54 and the outside contact surface 84 of the inner insert 52. Furthermore, the inner insert 52 is positioned such that the inside contact surface 88 thereof, including the shape-memory alloy cladding 94, mates with the contact surface 68 of the driveshaft 50. In an exemplary embodiment, during assembly, a clearance fit is established between the shape-memory alloy cladding 94 of the inner insert 52 and the contact surface 68 of the driveshaft. Finally, the tension lock-nut 100 is advanced in the axial direction 106, as discussed above, in order to apply a preload on the inner and outer inserts 52 and 54, respectively (most clearly shown in FIG. 6). In several exemplary embodiments, when the torque transmission joint 46 is assembled as such, and before the shape-memory alloy cladding 94 and 96 undergoes the solid phase transformation from twinned-martensite to austenite, clearance fits are maintained between the driveshaft 50, the inner insert 52, and the outer insert 54, as shown in FIG. 7A. Alternatively, before the shape-memory alloy cladding 94 and 96 undergoes the solid phase transformation from twinned-martensite to austenite, slight interference fits may be maintained between the driveshaft 50, the inner insert 52, and the outer insert 54.

Referring to FIG. 7B, the torque transmission joint 46 is depicted with the shape-memory alloy cladding 94 and 96 in the austenite solid phase. The shape-memory alloy cladding 94 and 96, respectively, are formulated so that the solid phase transformation from twinned-martensite to austenite occurs at a temperature above the temperature at which the torque transmission joint 46 is assembled, but below the downhole temperature at which the torque transmission joint 46 operates within the wellbore 38. When the shape-memory alloy cladding 94 and 96 of the assembled torque transmission joint 46 are subject to a solid phase transformation from twinned-martensite to austenite, interference fits are established between the driveshaft 50, the inner insert 52, and the outer insert 54. Specifically, the shape-memory alloy cladding 94, which is bonded to at least a portion of the inside contact surface 88 of the inner insert 52, exhibits a strain caused by the solid phase transformation from twinned-martensite to austenite. As a result, the shape-memory alloy 94 shrinks onto the contact surface 68 of the driveshaft 50, thereby establishing an interference fit between the inner insert 52 and the driveshaft 50. Furthermore, the shape-memory alloy cladding 96, which is bonded to at least a portion of the inside contact surface 80 of the outer insert 54, also exhibits a strain caused by the solid phase transformation from twinned-martensite to austenite. As a result, the shape-memory alloy 96 shrinks onto the outside contact surface 84 if the inner insert 52, thereby establishing an interference fit between the outer insert 54 and the inner insert 52. In several exemplary embodiments, the transformation temperatures of the shape-memory alloy cladding 94 and 96, respectively, are configured such that, after the torque transmission joint 46 is assembled, but before being run downhole into the wellbore 38, the solid phase transformation of the shape-memory alloy cladding 94 and 96 from twinned-martensite to austenite occurs. Specifically, after the torque transmission joint 46 is assembled, the respective temperatures of the shape-memory alloy cladding 94 and 96 are increased to effect a solid phase transformation from twinned-martensite to austenite. As a result, a slight interference fit is established between the driveshaft 50, the inner insert 52, and the outer insert 54, even before the torque transmission joint 46 is run into the wellbore 38. As the torque transmission joint 46 is run into the wellbore 38, the temperature of the shape-memory alloy cladding 94 and 96 progressively increases, resulting in a progressively tighter interference fit between the driveshaft 50, the inner insert 52, and the outer insert 54.

In several exemplary embodiments, the shape-memory alloy cladding 94 and 96 improves the reliability of one or more interference fits within the torque transmission joint 46, thereby improving the performance of the bottom-hole assembly 42. In several exemplary embodiments, the shape-memory alloy cladding 94 and 96 reduces the labor time required to assembly and/or disassemble the torque transmission joint 46. In several exemplary embodiments, the shape-memory alloy cladding 94 and 96, decreases the occurrence of wear between the driveshaft 50, the inner insert 52, and the outer insert 54, thereby preventing, or at least reducing, a loss of torque transfer and/or eventual failure of the torque transmission joint 46. In several exemplary embodiments, the torque transmission joint 46, including the shape-memory alloy cladding 94 and 96, prevents, or at least reduces, damage to the bus wires 108 by decreasing the occurrence of relative movement between the substantially aligned radially extending ports 66 and 102, respectively, of the driver sub 48 and the wire cap 98. Furthermore, the shape-memory alloy cladding 94 and 96 prevents, or at least reduces, damage to the bus wires 108 by decreasing the occurrence of relative movement between the grooves 72 and 92, respectively, of the driveshaft 50 and the inner insert 52. As a result, the torque transmission joint 46, including the shape-memory alloy cladding 94 and 96, improves the reliability of signals communicated from various components of the bottom-hole assembly 42, via the telemetry system, along the drill string 36 and to the surface.

In several exemplary embodiments, the inner and outer inserts 52 and 54 are integrally formed. In several exemplary embodiments, one or the other of the shape-memory alloy cladding 94 and 96 are omitted. Although the torque transmission joint 46 has been described herein as including the inner and outer inserts 52 and 54, respectively, the torque transmission joint 46 may include any suitable number of inserts such as, for example, one insert, three inserts, four inserts, five inserts, or more, at least one of which includes shape-memory alloy cladding on an interior surface thereof. Furthermore, although the shape-memory alloy cladding 94 and 96 have been described herein as part of the torque transmission joint 46, any one of a number of torque transmission joints and/or interference fits may incorporate the shape-memory alloy cladding 94 and 96, or another shape-memory alloy cladding according to the present disclosure, in order to improve the performance and/or reliability thereof. In several exemplary embodiment, the contact surface 62 of the driver sub 48 includes a shape-memory alloy cladding (not shown) adapted to shrink onto the outside contact surface 74 of the outer insert.

The present disclosure introduces an apparatus adapted to be disposed within a wellbore, the apparatus comprising a driver sub comprising an annular body defining an internal surface, at least a portion of the internal surface of the driver sub defining a contact surface; a driveshaft extending within the driver sub, the driveshaft comprising an elongated body defining an external surface, at least a portion of the external surface of the driveshaft defining a contact surface; a first insert disposed adjacent and between the respective contact surfaces of the driver sub and the driveshaft, the first insert comprising an annular body defining internal and external surfaces, at least a portion of the internal surface of the first insert defining an inside contact surface, and at least a portion of the external surface of the first insert defining an outside contact surface; and a first shape-memory alloy cladding bonded to at least a portion of the inside contact surface of the first insert.

In an exemplary embodiment, the first shape-memory alloy cladding is actuatable between a first state and a second state; wherein, when the first shape-memory alloy cladding is in the first state, a first fit is maintained between the first shape-memory alloy cladding and the contact surface of the driveshaft; and wherein, when the first shape-memory alloy cladding is in the second state, a second fit, which is tighter than the first fit, is maintained between the first shape-memory alloy cladding and the contact surface of the driveshaft.

In another exemplary embodiment, the first shape-memory alloy cladding is actuated from the first state to the second state at a transformation temperature; wherein the first state of the first shape-memory alloy cladding is a twinned-martensite solid phase, which occurs when the first shape-memory alloy cladding is at a temperature below the transformation temperature; and wherein the second state of the first shape-memory alloy cladding is an austenite solid phase, which occurs when the first shape-memory alloy cladding is at a temperature above the transformation temperature.

In yet another exemplary embodiment, the inside contact surface of the first insert and the contact surface of the driveshaft each define a corresponding number of axially-extending and circumferentially-spaced polygonal flats; and wherein the polygonal flats on the inside contact surface of the first insert mate with the polygonal flats on the contact surface of driveshaft.

In certain exemplary embodiments, an internal shoulder is formed on the internal surface of the driver sub and adjacent the contact surface thereof; and wherein the first insert abuts the internal shoulder of the driver sub.

In an exemplary embodiment, a tension lock nut is threadably engaged with the external surface of the driveshaft and adapted to apply an axial load on the first insert; and wherein, when the tension lock nut applies an axial load on the first insert, the first insert is urged into contact with the internal shoulder of the driver sub.

In another exemplary embodiment, the contact surface of the driver sub and the outside contact surface of the first insert are tapered to a substantially equal degree; and wherein, when the tension lock nut applies an axial load on the first insert, the first insert and, consequently, the first shape-memory alloy cladding, are urged radially inward toward the contact surface of the driveshaft.

In yet another exemplary embodiment, the apparatus further comprises a second insert disposed adjacent and between the contact surface of the driver sub and the outside contact surface of the first insert, the second insert comprising an annular body defining an internal surface and an external surface, at least a portion of the internal surface of the second insert defining an inside contact surface, and at least a portion of the external surface of the second insert defining an outside contact surface; and a second shape-memory alloy cladding bonded to at least a portion of the inside contact surface of the second insert.

In certain exemplary embodiments, the first and second shape-memory alloy cladding are each actuatable between a first state and a second state; wherein, when the first shape-memory alloy cladding is in the first state, a first fit is maintained between the first shape-memory alloy cladding and the contact surface of the driveshaft; wherein, when the first shape-memory alloy cladding is in the second state, a second fit, which is tighter than the first fit, is maintained between the first shape-memory alloy cladding and the contact surface of the driveshaft; wherein, when the second shape-memory alloy cladding is in the first state, a third fit is maintained between the second shape-memory alloy cladding and the outside contact surface of the first insert; and wherein, when the second shape-memory alloy cladding is in the second state, a fourth fit, which is tighter than the third fit, is maintained between the second shape-memory alloy cladding and the outside contact surface of the first insert.

In an exemplary embodiment, the inside contact surface of the first insert and the contact surface of the driveshaft each define a corresponding number of axially-extending and circumferentially-spaced polygonal flats; wherein the inside contact surface of the second insert and the outside contact surface of the first insert each define a corresponding number of axially-extending and circumferentially-spaced polygonal flats; wherein the polygonal flats on the inside contact surface of the first insert mate with the polygonal flats on the contact surface of driveshaft; and wherein the polygonal flats on the inside contact surface of the second insert mate with the polygonal flats on the outside contact surface of the first insert.

In another exemplary embodiment, an internal shoulder is formed on the internal surface of the driver sub and adjacent the contact surface thereof, the second insert being adapted to abut the internal shoulder of the driver sub; and wherein an internal shoulder is formed on the internal surface of the second insert and adjacent the inside contact surface thereof, the first insert being adapted to abut the internal shoulder of the second insert.

In yet another exemplary embodiment, a tension lock nut is threadably engaged with the external surface of the driveshaft and adapted to apply an axial load on the first and second inserts; wherein, when the tension lock nut applies an axial load on the first insert, the first insert is urged into contact with the internal shoulder of the second insert; and wherein, when the tension lock nut applies an axial load on the second insert, the second insert is urged into contact with the internal shoulder of the driver sub.

In certain exemplary embodiments, the contact surface of the driver sub and the outside contact surface of the first insert are tapered to substantially the same degree; wherein the inside contact surface of the second insert and the outside contact surface of the first insert are tapered to substantially the same degree; and wherein, when the tension lock nut applies an axial load on the first insert, the first insert and, consequently, the first shape-memory alloy cladding, are urged radially inward toward the contact surface of the driveshaft; and wherein, when the tension lock nut applies an axial load on the second insert, the second insert and, consequently, the second shape-memory alloy cladding, are urged radially inward toward the outside contact surface of the first insert.

The present disclosure also introduces a method comprising: providing a first member comprising an annular body defining an internal surface, at least a portion of the internal surface of the first member defining a contact surface; positioning a second member within the first member, the second member comprising an elongated body defining an external surface, at least a portion of the external surface of the second member defining a contact surface; cladding a third member with a shape-memory alloy, the third member comprising an annular body defining internal and external surfaces, at least a portion of the internal surface of the third member defining an inside contact surface to which the shape-memory alloy is clad, and at least a portion of the external surface of the third member defining an outside contact surface; and positioning the third member adjacent and between the respective contact surfaces of the first and second members.

In an exemplary embodiment, the method further comprises actuating the shape-memory alloy between a first state and a second state; wherein, when the shape-memory alloy is in the first state, a first fit is maintained between the inside contact surface of the third member and the contact surface of the second member; and wherein, when the shape-memory alloy is in the second state, a second fit, which is tighter than the first fit is maintained between the inside contact surface of the third member and the contact surface of the second member.

In another exemplary embodiment, the shape-memory alloy is actuated from the first state to the second state at a transformation temperature; wherein the first state of the shape-memory alloy is a twinned-martensite solid phase, which occurs when the shape-memory alloy is at a temperature below the transformation temperature; and wherein the second state of the shape-memory alloy is an austenite solid phase, which occurs when the shape-memory alloy is at a temperature above the transformation temperature.

In yet another exemplary embodiment, the inside contact surface of the third member and the contact surface of the second member each define a corresponding number of axially-extending and circumferentially-spaced polygonal flats; and wherein, when the shape-memory alloy is actuated from the first state to the second state, the polygonal flats on the inside contact surface of the third member mate with the polygonal flats on the contact surface of second member.

In certain exemplary embodiments, the method further comprises cladding a fourth member with the shape-memory alloy, the fourth member comprising an annular body defining internal and external surfaces, at least a portion of the internal surface of the fourth member defining an inside contact surface to which the shape-memory alloy is clad, and at least a portion of the external surface of the fourth member defining an outside contact surface; and positioning the fourth member adjacent and between the outside contact surfaces of the third member and the contact surface of the first member, respectively.

In an exemplary embodiment, the method further comprises actuating the shape-memory alloy of the third and fourth members, respectively, between a first state and a second state; wherein, when the shape-memory alloy of the third member is in the first state, a first fit is maintained between the inside contact surface of the third member and the contact surface of the second member; wherein, when the shape-memory alloy of the third member is in the second state, a second fit, which is tighter than the first fit, is maintained between the inside contact surface of the third member and the contact surface of the second member; wherein, when the shape-memory alloy of the fourth member is in the first state, a third fit is maintained between the inside contact surface of the fourth member and the outside contact surface of the third member; and wherein, when the shape-memory alloy of the fourth member is in the second state, a fourth fit, which is tighter than the third fit, is maintained between the inside contact surface of the fourth member and the outside contact surface of the third member.

In another exemplary embodiment, the inside contact surface of the third member and the contact surface of the second member each define a corresponding number of axially-extending and circumferentially-spaced polygonal flats; wherein the inside contact surface of the fourth member and the outside contact surface of the third member each define a corresponding number of axially-extending and circumferentially-spaced polygonal flats; wherein, when the shape-memory alloy cladding of the third member is actuated from the first state to the second state, the polygonal flats on the inside contact surface of the third member mate with the polygonal flats on the contact surface of second member; and wherein, when the shape-memory alloy cladding of the fourth member is actuated from the first state to the second state, the polygonal flats on the inside contact surface of the fourth member mate with the polygonal flats on the outside contact surface of the third member.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

Although several exemplary embodiments have been disclosed above, the embodiments disclosed are exemplary only and not limiting, and it should be readily appreciated that other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. An apparatus adapted to be disposed within a wellbore, the apparatus comprising:
   a driver sub comprising an annular body defining an internal surface, at least a portion of the internal surface of the driver sub defining a contact surface;
   a driveshaft extending within the driver sub, the driveshaft comprising an elongated body defining an external surface, at least a portion of the external surface of the driveshaft defining a contact surface;
   a first insert disposed adjacent and between the respective contact surfaces of the driver sub and the driveshaft, the first insert comprising an annular body defining internal and external surfaces, at least a portion of the internal surface of the first insert defining an inside contact surface, and at least a portion of the external surface of the first insert defining an outside contact surface; and
   a first shape-memory alloy cladding bonded to at least a portion of the inside contact surface of the first insert and configured to transmit torque between the first insert and the driveshaft.

2. The apparatus as recited in claim 1, wherein the first shape-memory alloy cladding is actuatable between a first state and a second state;
   wherein, when the first shape-memory alloy cladding is in the first state, a first fit is maintained between the first shape-memory alloy cladding and the contact surface of the driveshaft; and
   wherein, when the first shape-memory alloy cladding is in the second state, a second fit, which is tighter than the first fit, is maintained between the first shape-memory alloy cladding and the contact surface of the driveshaft.

3. The apparatus as recited in claim 2, wherein the first shape-memory alloy cladding is actuated from the first state to the second state at a transformation temperature;
   wherein the first state of the first shape-memory alloy cladding is a twinned-martensite solid phase, which occurs when the first shape-memory alloy cladding is at a temperature below the transformation temperature; and
   wherein the second state of the first shape-memory alloy cladding is an austenite solid phase, which occurs when the first shape-memory alloy cladding is at a temperature above the transformation temperature.

4. The apparatus of claim 1, wherein the inside contact surface of the first insert and the contact surface of the driveshaft each define a corresponding number of axially-extending and circumferentially-spaced polygonal flats; and
   wherein the polygonal flats on the inside contact surface of the first insert mate with the polygonal flats on the contact surface of driveshaft.

5. An apparatus adapted to be disposed within a wellbore, the apparatus comprising:

a driver sub comprising an annular body defining an internal surface, at least a portion of the internal surface of the driver sub defining a contact surface;

a driveshaft extending within the driver sub, the driveshaft comprising an elongated body defining an external surface, at least a portion of the external surface of the driveshaft defining a contact surface;

a first insert disposed adjacent and between the respective contact surfaces of the driver sub and the driveshaft, the first insert comprising an annular body defining internal and external surfaces, at least a portion of the internal surface of the first insert defining an inside contact surface, and at least a portion of the external surface of the first insert defining an outside contact surface; and a first shape-memory alloy cladding bonded to at least a portion of the inside contact surface of the first insert, wherein the contact surface of the driver sub and the outside contact surface of the first insert are tapered to a substantially equal degree.

6. The apparatus as recited in claim 5, wherein a tension lock nut is threadably engaged with the external surface of the driveshaft and adapted to apply an axial load on the first insert; and wherein, when the tension lock nut applies an axial load on the first insert, the first insert and, consequently, the first shape-memory alloy cladding, are urged radially inward toward the contact surface of the driveshaft.

7. An apparatus adapted to be disposed within a wellbore, the apparatus comprising:

a driver sub comprising an annular body defining an internal surface, at least a portion of the internal surface of the driver sub defining a contact surface;

a driveshaft extending within the driver sub, the driveshaft comprising an elongated body defining an external surface, at least a portion of the external surface of the driveshaft defining a contact surface;

a first insert disposed adjacent and between the respective contact surfaces of the driver sub and the driveshaft, the first insert comprising an annular body defining internal and external surfaces, at least a portion of the internal surface of the first insert defining an inside contact surface, and at least a portion of the external surface of the first insert defining an outside contact surface;

a first shape-memory alloy cladding bonded to at least a portion of the inside contact surface of the first insert;

a second insert disposed adjacent and between the contact surface of the driver sub and the outside contact surface of the first insert, the second insert comprising an annular body defining an internal surface and an external surface, at least a portion of the internal surface of the second insert defining an inside contact surface, and at least a portion of the external surface of the second insert defining an outside contact surface; and a second shape-memory alloy cladding bonded to at least a portion of the inside contact surface of the second insert.

8. The apparatus as recited in claim 7, wherein the first and second shape-memory alloy cladding are each actuatable between a first state and a second state;

wherein, when the first shape-memory alloy cladding is in the first state, a first fit is maintained between the first shape-memory alloy cladding and the contact surface of the driveshaft;

wherein, when the first shape-memory alloy cladding is in the second state, a second fit, which is tighter than the first fit, is maintained between the first shape-memory alloy cladding and the contact surface of the driveshaft;

wherein, when the second shape-memory alloy cladding is in the first state, a third fit is maintained between the second shape-memory alloy cladding and the outside contact surface of the first insert; and wherein, when the second shape-memory alloy cladding is in the second state, a fourth fit, which is tighter than the third fit, is maintained between the second shape-memory alloy cladding and the outside contact surface of the first insert.

9. The apparatus as recited in claim 7, wherein the inside contact surface of the first insert and the contact surface of the driveshaft each define a corresponding number of axially-extending and circumferentially-spaced polygonal flats;

wherein the inside contact surface of the second insert and the outside contact surface of the first insert each define a corresponding number of axially-extending and circumferentially-spaced polygonal flats;

wherein the polygonal flats on the inside contact surface of the first insert mate with the polygonal flats on the contact surface of driveshaft; and wherein the polygonal flats on the inside contact surface of the second insert mate with the polygonal flats on the outside contact surface of the first insert.

10. The apparatus as recited in claim 7, wherein an internal shoulder is formed on the internal surface of the driver sub and adjacent the contact surface thereof, the second insert being adapted to abut the internal shoulder of the driver sub; and wherein an internal shoulder is formed on the internal surface of the second insert and adjacent the inside contact surface thereof, the first insert being adapted to abut the internal shoulder of the second insert.

11. The apparatus as recited in claim 10, wherein a tension lock nut is threadably engaged with the external surface of the driveshaft and adapted to apply an axial load on the first and second inserts;

wherein, when the tension lock nut applies an axial load on the first insert, the first insert is urged into contact with the internal shoulder of the second insert; and wherein, when the tension lock nut applies an axial load on the second insert, the second insert is urged into contact with the internal shoulder of the driver sub.

12. The apparatus as recited in claim 11, wherein the contact surface of the driver sub and the outside contact surface of the first insert are tapered to substantially the same degree;

wherein the inside contact surface of the second insert and the outside contact surface of the first insert are tapered to substantially the same degree; and wherein, when the tension lock nut applies an axial load on the first insert, the first insert and, consequently, the first shape-memory alloy cladding, are urged radially inward toward the contact surface of the driveshaft; and wherein, when the tension lock nut applies an axial load on the second insert, the second insert and, consequently, the second shape-memory alloy cladding, are urged radially inward toward the outside contact surface of the first insert.

13. A method comprising:

providing a first member comprising an annular body defining an internal surface, at least a portion of the internal surface of the first member defining a contact surface;

positioning a second member within the first member, the second member comprising an elongated body defining an external surface, at least a portion of the external surface of the second member defining a contact surface;

cladding a third member with a shape-memory alloy, the third member comprising an annular body defining internal and external surfaces, at least a portion of the internal surface of the third member defining an inside contact surface to which the shape-memory alloy is clad, and at least a portion of the external surface of the third member defining an outside contact surface;

positioning the third member adjacent and between the respective contact surfaces of the first and second members; and transmitting, using at least the shape memory alloy, torque from the third member to the second member.

14. The method as recited in claim 13, wherein the method further comprises actuating the shape-memory alloy between a first state and a second state;

wherein, when the shape-memory alloy is in the first state, a first fit is maintained between the inside contact surface of the third member and the contact surface of the second member; and wherein, when the shape-memory alloy is in the second state, a second fit, which is tighter than the first fit is maintained between the inside contact surface of the third member and the contact surface of the second member.

15. The method as recited in claim 14, wherein the shape-memory alloy is actuated from the first state to the second state at a transformation temperature;

wherein the first state of the shape-memory alloy is a twinned-martensite solid phase, which occurs when the shape-memory alloy is at a temperature below the transformation temperature; and wherein the second state of the shape-memory alloy is an austenite solid phase, which occurs when the shape-memory alloy is at a temperature above the transformation temperature.

16. The method as recited in claim 15, wherein the inside contact surface of the third member and the contact surface of the second member each define a corresponding number of axially-extending and circumferentially-spaced polygonal flats; and wherein, when the shape-memory alloy is actuated from the first state to the second state, the polygonal flats on the inside contact surface of the third member mate with the polygonal flats on the contact surface of second member.

17. A method comprising:

providing a first member comprising an annular body defining an internal surface, at least a portion of the internal surface of the first member defining a contact surface;

positioning a second member within the first member, the second member comprising an elongated body defining an external surface, at least a portion of the external surface of the second member defining a contact surface;

cladding a third member with a shape-memory alloy, the third member comprising an annular body defining internal and external surfaces, at least a portion of the internal surface of the third member defining an inside contact surface to which the shape-memory alloy is clad, and at least a portion of the external surface of the third member defining an outside contact surface;

positioning the third member adjacent and between the respective contact surfaces of the first and second members;

cladding a fourth member with the shape-memory alloy, the fourth member comprising an annular body defining internal and external surfaces, at least a portion of the internal surface of the fourth member defining an inside contact surface to which the shape-memory alloy is clad, and at least a portion of the external surface of the fourth member defining an outside contact surface; and positioning the fourth member adjacent and between the outside contact surfaces of the third member and the contact surface of the first member, respectively.

18. The method as recited in claim 17, wherein the method further comprises actuating the shape-memory alloy of the third and fourth members, respectively, between a first state and a second state;

wherein, when the shape-memory alloy of the third member is in the first state, a first fit is maintained between the inside contact surface of the third member and the contact surface of the second member;

wherein, when the shape-memory alloy of the third member is in the second state, a second fit, which is tighter than the first fit, is maintained between the inside contact surface of the third member and the contact surface of the second member;

wherein, when the shape-memory alloy of the fourth member is in the first state, a third fit is maintained between the inside contact surface of the fourth member and the outside contact surface of the third member; and wherein, when the shape-memory alloy of the fourth member is in the second state, a fourth fit, which is tighter than the third fit, is maintained between the inside contact surface of the fourth member and the outside contact surface of the third member.

19. The method as recited in claim 18, wherein the inside contact surface of the third member and the contact surface of the second member each define a corresponding number of axially-extending and circumferentially-spaced polygonal flats;

wherein the inside contact surface of the fourth member and the outside contact surface of the third member each define a corresponding number of axially-extending and circumferentially-spaced polygonal flats;

wherein, when the shape-memory alloy cladding of the third member is actuated from the first state to the second state, the polygonal flats on the inside contact surface of the third member mate with the polygonal flats on the contact surface of second member; and wherein, when the shape-memory alloy cladding of the fourth member is actuated from the first state to the second state, the polygonal flats on the inside contact surface of the fourth member mate with the polygonal flats on the outside contact surface of the third member.

* * * * *